United States Patent [19]

Yoshio

[11] Patent Number: 4,698,795

[45] Date of Patent: Oct. 6, 1987

[54] TRACKING SERVO DEVICE

[75] Inventor: Junichi Yoshio, Saitama, Japan

[73] Assignee: Pioneer Electronic Corporation, Tokyo, Japan

[21] Appl. No.: 744,436

[22] Filed: Jun. 13, 1985

[30] Foreign Application Priority Data

Jun. 13, 1984 [JP] Japan ............................ 59-121088

[51] Int. Cl.$^4$ ............................................. G11B 7/095
[52] U.S. Cl. ..................................... 369/44; 250/202; 358/907; 360/10.1
[58] Field of Search ...................... 369/43, 44, 45, 46, 369/32, 33, 41; 250/202; 358/342, 907; 360/10.1

[56] References Cited

U.S. PATENT DOCUMENTS

| 4,340,950 | 7/1982 | Kosoba | 369/44 |
| 4,545,003 | 10/1985 | Hirano | 369/44 |
| 4,587,644 | 5/1986 | Fujire | 369/44 |

Primary Examiner—Alan Faber

Attorney, Agent, or Firm—Sughrue, Mion, Zinn, Macpeak & Seas

[57] ABSTRACT

A tracking servo device for controlling the relative position in the radial direction of a recorded disc between an information reading point of a pick-up and a recorded track having an improved accuracy in performing track-jumping operations. In accordance with the invention, the track jumping operations are performed only in response to a tracking error signal, that is, without the use of a jump drive signal or brake signal, whereby fine control and adjustment of various signals within the circuit are made unnecessary and accurate and quick track jumping operations are ensured. To achieve this, an in-phase and an out-of-phase signal with respect to the tracking error signal are produced and alternately selected through a switch. The levels of the signals applied to the switch may be clamped to prevent them from passing through zero. The selection operation performed by the switch is controlled in accordance with the level of the tracking error signal, specifically, switching is effected when the tracking error signal exceeds a zero reference level.

6 Claims, 5 Drawing Figures

TRACKING SERVO DEVICE

BACKGROUND OF THE INVENTION

The present invention relates to a tracking servo device used in a recorded information reading device.

In a device for reading recorded information from a disc-like recording medium such as a video disc, a digital audio disc, or the like, a tracking servo system is employed with which it is ensured that the recorded track is always accurately traced by an information reading point in spite of eccentricity of the disc, etc. In some reading devices, an information search function (random access function) is additionally provided so that the information reading point can be driven in the direction substantially perpendicular to the track, that is, in the radial direction of the disc, to thereby perform track jumping.

FIG. 1 is a schematic block diagram showing such a conventional reading device. As shown in this drawing, there is provided a tracking error signal generating circuit 1 for generating a tracking error signal indicative of an amount of positional shift in the radial direction of the disc between the information reading point of a pick-up and the recording track of the disc. The tracking error signal generation circuit 1 has a well-known structure, for example, it can be implemented by a pair of light-detecting elements receiving a pair of respective light spots which are reflected from the recorded surface of the disc and a differential amplifier for producing a signal representing the difference between the outputs of the two light-detecting elements. The tracking error signal is supplied to a driver amplifier 4, constituted by an operational amplifier $OP_1$, through an equalizer 2 and a loop switch 3. A tracking actuator, driven by the output of the driver amplifier 4, effects displacement of the information reading point in the radial direction of the disc. In this example, the actuator is constituted by a coil 5 and a tracking mirror 6 rotatably driven by the coil 5. The current flowing in the coil 5 is detected by a resistor $R_1$, and the detected output is fed back to the driver amplifier 4 through a feedback resistor $R_2$ to thereby stabilize the system.

The arrangement as described above forms part of the tracking servo system. The tracking servo system also includes a jump operation control system (described below in more detail). Accordingly, the reading device can perform random access, that is, recorded information searching, on the disc.

The jump operation control system includes a controller 7 receives a tracking error signal A and a jump instruction signal B and produces in response a control signal C for controlling the on/off operation of the loop switch 3 and a drive/jump brake signal D which is superimposed on an output of the loop switch 3.

FIG. 2 is a waveform diagram used for explaining the operation of the device of FIG. 1. In FIG. 2, A to D indicate waveforms of the signals A to D, respectively, at the indicated circuit points in FIG. 1. When the information reading point is moved in the radial direction of the disc, the tracking error signal A is generally a sinusoidal wave signal having a period corresponding to the distance between adjacent tracks.

The zero-crossing points a and b of the signal A occur at centers of adjacent tracks. Where jumping of one track is performed (from the track of the point a to the track of the point b), when the jump instruction signal B is applied to the controller 7 when the information reading point at the point a, at which time the loop switch 3 is in its closed state in response to a high-level control signal C so that the servo loop is closed, the level of the control signal C is made low to open the loop switch 3 and thus open the servo loop. At the same time, a jump drive signal P, as shown by D in FIG. 2, is produced by the controller 7 and applied to the coil 5 (constituting the actuator) through the driver amplifier 4.

Accordingly, the tracking mirror 6 is rotated by the drive coil 5 to cause the information reading point (light spot) to move in the radial direction of the disc, that is, in the direction perpendicular to the track. The level of the tracking error signal A becomes zero when the information reading point reaches a position substantially midway between two recording tracks and becomes zero again when it reaches the center of the next recording track at b. The level of the control signal C produced by the controller 7 changes from low to high at b to thereby close the servo loop. At the same time, a jump brake signal Q, as shown by D in FIG. 2, is produced by the controller 7 with which the movement of the actuator is braked. Thus, the information reading point is jumped to the adjacent track to thereby complete one track jumping operation.

The thus-arranged conventional device has a drawback that, in order to accurately perform the jumping operation, it is necessary to very precisely control the various waveforms, timing points, peak values, total energies, etc., of the jumping drive and brake signals P and Q shown in FIG. 2. Also, it is difficult to perform accurate jumping over several recording tracks, and thus the jumping operation cannot always be stably performed. Further, since the jumping operation is performed with the servo loop opened, there may be some cases where the number of tracks jumped varies depending on the degree of eccentricity of the disc.

SUMMARY OF THE INVENTION

An object of the present invention is to eliminate the foregoing drawbacks of the conventional device.

Another object of the present invention is to provide a tracking servo device in which jumping operations are performed only on the basis of a tracking error signal, that is, without the use of a jump drive signal or a brake signal, so that fine control and adjustment are made unnecessary and accurate and quick jumping operations can be ensured.

According to one aspect of the present invention, a tracking servo device is provided in which an in-phase signal and a 180°-out-of-phase signal (with respect to the tracking error signal) are alternatively produced, the alternative selection being performed, in a recording track jumping operation, by the detection of the fact that the tracking error signal has exceeded a reference lever, thereby making it possible to control the recording track jumping operation on the basis of the selected output.

Other objects and features of the present invention will be apparent from the following description taken in conjunction with accompanying drawings.

DESCRIPTION OF THE PREFERRED EMBODIMENTS

Figure 1:
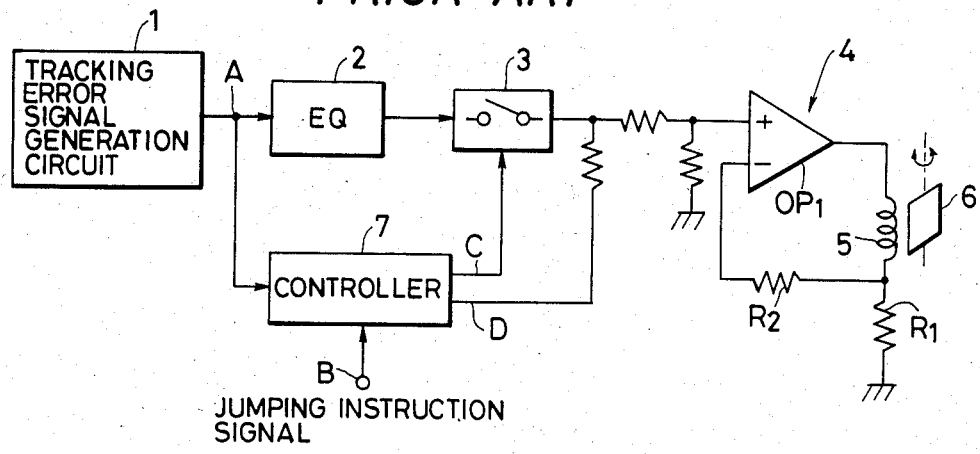
FIG. 1 is a block diagram showing a conventional reading device.
Figure 2:
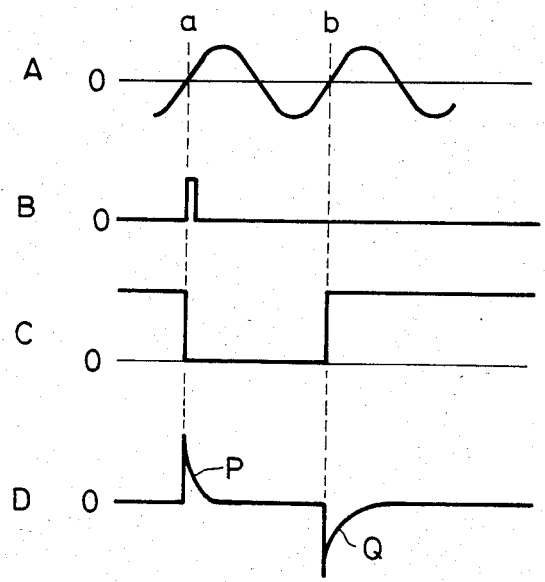
FIG. 2 is a diagram showing waveforms of various signals in the device of FIG. 1.

Referring to the drawings, a preferred embodiment of the present invention will be described hereunder.

Figure 3:
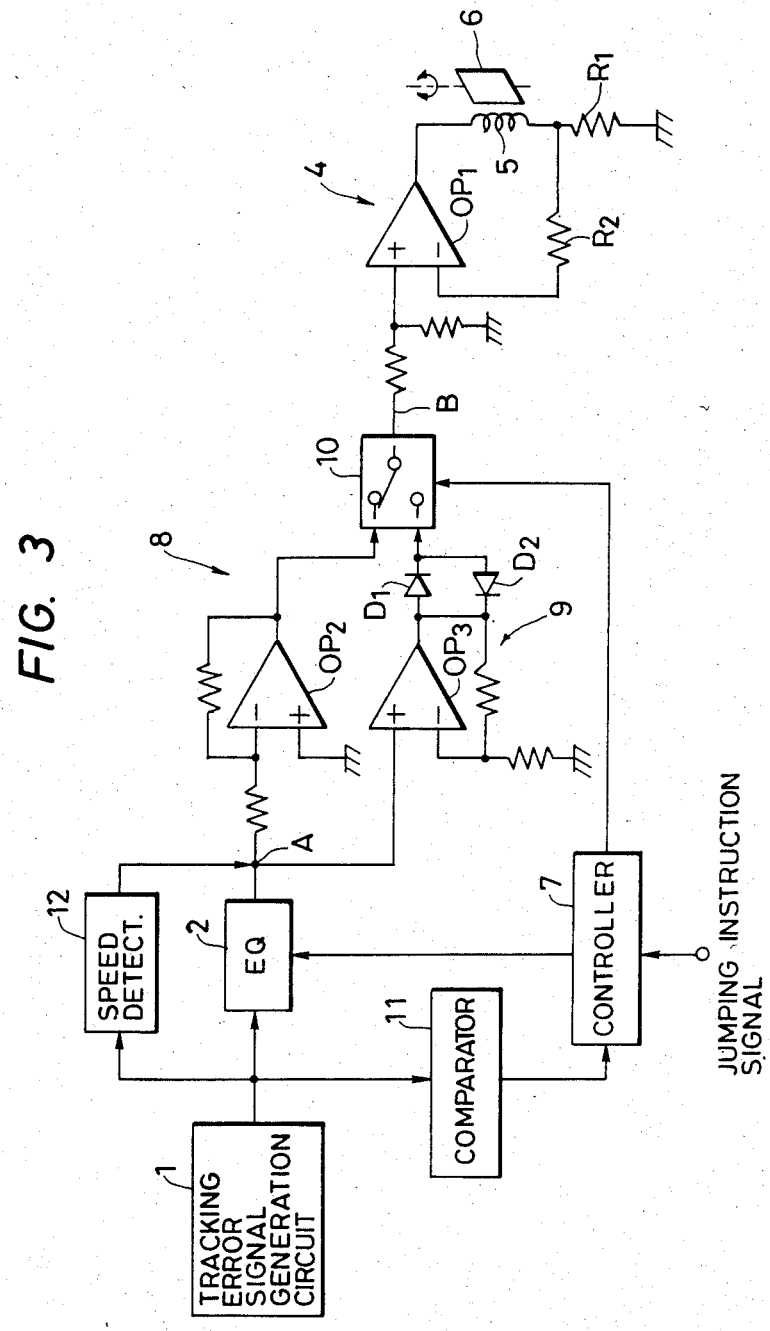
FIG. 3 is a block diagram showing a preferred embodiment of a tracking servo device according to the present invention.

Specifically, FIG. 3 is a block diagram showing a preferred embodiment of the tracking servo device according to the present invention, and in FIG. 3 elements corresponding to those in FIG. 1 are indicated by like reference numerals.

In FIG. 3, a tracking error signal passed through an equalizer 2 is amplified by an amplifier 8, constituted by an operational amplifier $OP_2$, and then applied to one input of a changeover switch 10 constituting a selecting device. The tracking error signal is also inversely amplified by an inverting amplifier 9, constituted by an operational amplifier $OP_3$, and then applied to the other input of the changeover switch 10. Back-to-back connected diodes $D_1$ and $D_2$ are connected between the output terminal of the inverting amplifier 9 and the other input terminal of the changeover switch 10 to prevent the tracking error signal passed through the inverting amplifier 9 from passing through zero.

A comparator 11 detects when the tracking error signal exceeds the zero level (reference level). The detection output of the comparator 11 is supplied to a controller 7. In a jumping operation, the controller 7 controls the switch 10 on the basis of the output of the comparator 11 so that the outputs of the amplifier 8 (first error signal) and the inverting amplifier 9 (second error signal) are alternatively selected and supplied to a driver amplifier 4. Further, in a one-track jumping operation in which jumping is performed to an adjoining recorded track, the controller 7 controls the equalizer 2 so as to suitably set the gain and phase compensation of the system in such a manner as to ensure stability of the system after jumping, whereby the jump to the target track can be completed rapidly.

A speed servo system includes a speed detector 12 which detects the operating speed of a tracking actuator on the basis of an error signal produced by the tracking error signal generation circuit 1. The output of the speed detector 12 is employed to prevent unnecessary acceleration of the actuator in jumping over several recording tracks. The speed detector portion 12 may be a well-known device in which a tracking error signal is F-V (frequency-to-voltage) converted into a speed signal.

Next, a description will be given regarding the operation of the device according to the present invention.

Figure 4:
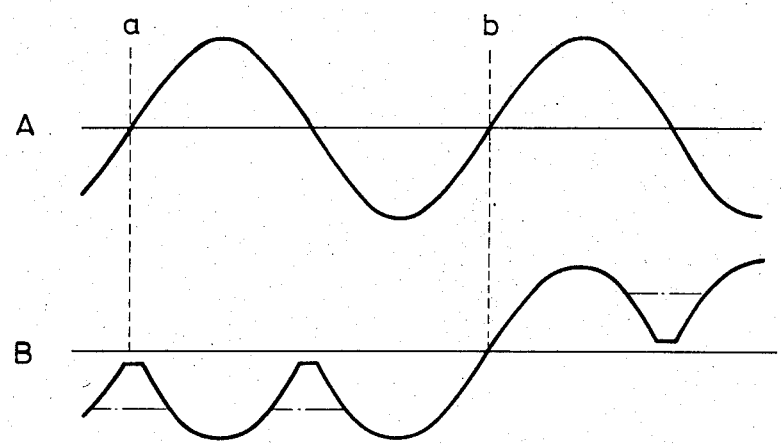
FIG. 4 is a diagram showing waveforms of signals at various points in the device of FIG. 3.
Figure 5:
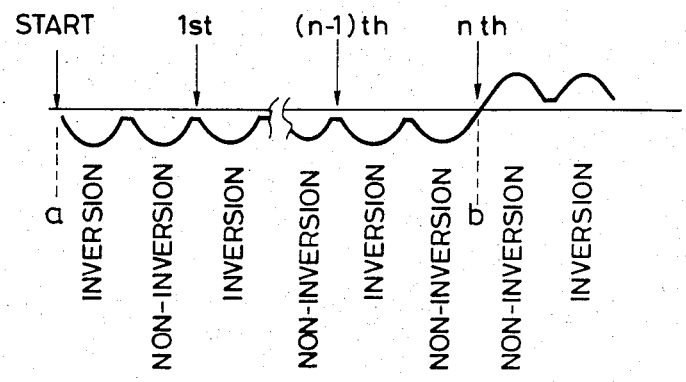
FIG. 5 is a waveform diagram showing signals when jumping several tracks in a single operation.

It is first assumed that the servo system is closed at location a indicated in FIG. 5 and the information reading point is caused to jump to the adjacent track, that is, to location b. At the time the jump is to be effected, as shown by waveform B in FIG. 4, the trackimg error signal is inverted, that is, one of the outputs of the amplifier 8 and the output of the inverting amplifier 9 is selected by controlling the changeover switch 10 on the basis of the tracking error signal so that the stable operating point of the servo system becomes only the location b.

Although the diodes $D_1$ and $D_2$ are provided so that the inverted tracking error signal cannot go to zero after the jumping operation has been completed, it is possible to omit the diodes $D_1$ and $D_2$. Further, if a larger shift is to be performed, the servo system may be made to have characteristics as shown by the chain line of waveform in FIG. 4.

Next, description will be given regarding a case of jumping over several tracks. In this case, with one-track jumping as described above as a reference operation, the location b may be considered as a further adjacent location. That is, in jumping over several tracks, the controller 7 controls the changeover operation of the switch 10 on the basis of the output of the comparator 11 to repeat the inversion/noninversion of the polarity of the tracking error signal until the new location b has been reached. With this operation as a reference, a phantom tracking error signal in the jumping operation over n tracks is as shown in FIG. 5. During such a jumping operation, the actuator is continuously accelerated before the information reading point reaches the n-th track. During this time, unnecessary acceleration is suppressed by the operation of the speed servo system constituted by the detector portion 12. Deceleration for preventing unnecessary acceleration is performed by exchanging the order of inversion/noninversion of the tracking error signal such that the tracking error signal has a polarity which effects braking of the movement of the actuator. Thus, track jumping is performed in accordance with the invention by selectively inverting the polarity of the tracking error signal at the zero crossing points thereof.

In a case where the information reading point is jumped to an adjacent track after the polarity of the servo system has been changed to the normal polarity at the location b when the momentum retained by the actuator is large, there is a great possibility that the jumping movement was performed when the actuator was moving toward the location b from the location a. Accordingly, the foregoing one-track jumping operation is performed in the reverse direction when the (n+1)th track has been counted so that the information reading point can be surely jumped to the n-th track.

Further, in order to determine the direction of jumping when the information reading point is jumped, it is detected whether the operating direction of the actuator is positive or negative with respect to the zero crossing point of the tracking error signal, and the foregoing operation sequence is initiated when the operating direction of the actuator agrees with the desired one. This operation provides improved reliability. Moreover, in the case where the servo system is not stabilized due to offset or the like, a trigger pulse for setting the direction may be added to the servo system so that initial setting of the direction can be surely performed. The magnitude of the trigger pulse is small relative to the jump pulse in the conventional device since the trigger pulse only initiates the direction of the movement and jumping energy is provided by the tracking error signal.

Although description has been made as to an embodiment in which the inversion of the tracking error signal is performed prior to a final stage of the servo system, the inversion may be performed at any position, for example, prior to the equalizer 2.

As described above in detail, according to the present invention, the jumping operation is performed only on the basis of the tracking error signal (except the trigger pulse), that is, without the use of any jumping drive signal or brake signal as in the prior art systems. As a result, it is unnecessary to perform fine adjustment for every system. Further, because the jumping operation is performed using a closed-loop servo system, the tracking operation ensures that eccentricities of the disc can be followed and can handle variations in the number of jumped tracks, which is difficult with an open-loop servo system. Further, since it is not necessary to perform an opening/closing changeover operation of the servo system, a tracking servo device is thereby provided in which the servo system can quickly reach a target location.

What is claimed is:

1. A tracking servo device for controlling a relative position in the radial direction of a disc-shaped recording medium between an information reading point of a pick-up and a recording track on said medium in response to a tracking error signal produced in accordance with an offset of said relative position, said tracking servo device comprising:

means for detecting when said tracking error signal exceeds a reference level;

means for producing first and second error signals, said first and second error signals following in waveshape said tracking error signal and being respectively in-phase with and 180° out of phase with said tracking error signal;

means for alternately selecting one of said first and second error signals; and means for controlling said selecting means in response to an output of said detector means in a jumping operation, whereby a jumping operation over said recording track by said information reading point is controlled in response to an output signal of said selecting means.

2. The tracking servo device of claim 1, wherein said means for producing said first and second error signals comprises a first operational amplifier to an inverting input terminal of which said tracking error signal is applied, and a second operational amplifier to a noninverting input of which said tracking error signal is applied.

3. The tracking servo device of claim 2, further comprising level clamping means coupled to said second operational amplifier.

4. The tracking servo device of claim 3, wherein said level clamping means comprises a pair of back-to-back coupled diodes coupled between an output of said second operational amplifier and said selecting means.

5. The tracking servo device of claim 1, wherein said selecting means comprises a switch having input terminals receiving said first and second error signals, and a control input coupled to receive an output of said controlling means.

6. The tracking servo device of claim 1, further comprising means for producing a trigger pulse for setting an initial direction.

* * * * *